United States Patent
Collins et al.

(10) Patent No.: US 6,944,516 B1
(45) Date of Patent: Sep. 13, 2005

(54) METHOD FOR ERROR PROOFING BODY SHOP COMPONENT SELECTION

(75) Inventors: Dave Roy Collins, Canton, MI (US); Steve Wendland, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 09/561,359

(22) Filed: Apr. 28, 2000

(51) Int. Cl.$^7$ .............................. G06F 19/00
(52) U.S. Cl. ............... 700/109; 700/95; 700/100; 700/108; 700/110; 29/712
(58) Field of Search ............... 700/95, 100, 108, 700/109, 110, 115, 116, 117, 245; 29/711, 712

(56) References Cited

U.S. PATENT DOCUMENTS

| | | | |
|---|---|---|---|
| 4,332,012 A | * 5/1982 | Sekine et al. | 700/116 |
| 5,272,805 A | * 12/1993 | Akeel et al. | 29/712 |
| 6,278,906 B1 | * 8/2001 | Piepmeier et al. | 700/250 |
| 6,381,509 B1 | * 4/2002 | Thiel et al. | 700/115 |

* cited by examiner

Primary Examiner—Albert W. Paladini
Assistant Examiner—Charles Kasenge
(74) Attorney, Agent, or Firm—David B. Kelley

(57) ABSTRACT

A method for error proofing body shop component begins by scheduling the production of a vehicle body using an assembly plant controller. A version of a sheet metal component is then selected. The version of the sheet metal component determines what body type will be produced. To insure that the proper body type is being produced, the assembly plant controller verifies the version of the sheet metal component by using a plurality of sensors. If the wrong sheet metal component is detected, then the body shop process is stopped and the wrong sheet metal part is replaced with the correct sheet metal part. Once all correct sheet metal parts are in place, they are spot welded together to produce a vehicle body.

10 Claims, 1 Drawing Sheet

US 6,944,516 B1

METHOD FOR ERROR PROOFING BODY SHOP COMPONENT SELECTION

TECHNICAL FIELD

The present invention relates generally to assembly processes and, more particularly, to a method for error proofing body shop component selection.

BACKGROUND ART

In order to remain successful, many industries produce multiple versions of consumer goods. If the customer cannot select different versions of consumer goods to suit his or her needs, then the customer will find alternative, producers of a similar product with more options. Therefore, it is in the best interests of producers of consumer goods to constantly strive to produce these multiple versions of consumer goods to satisfy a wide range of customers.

One example of this is the welding process in an assembly plant where the process is capable of producing a multitude of vehicle bodies on one assembly line. This allows different customers to customize the body style of the vehicle they have ordered to meet their preferences. Unfortunately, in many cases, each version of a vehicle may require different sheet metal parts. Because of this, occasionally, one version of a vehicle may end up with parts from a different, incompatible version. (for example, while there is no such thing as a two seat Navigator, it is possible to assemble the wrong sheet metal parts and produce a two seat Navigator, which in turn can only be scraped.).

In the past, a body shop would produce different versions of vehicle bodies and tell the assembly plant what they had built. This made the facility very large. In order to reduce the size of body shop facilities, a body shop must now build vehicles in approximately the order they are needed. To insure that the correct parts are used for each version of vehicle body an operator manually verifies each part. Unfortunately, errors occasionally arise.

The disadvantages associated with conventional body shop component selection techniques have made it apparent that a new technique for error proofing body shop component selection is needed. The new technique should be able to automatically determine if the correct sheet metal parts have been selected. The new technique should also reduce the number of scrap bodies caused by human error.

SUMMARY OF THE INVENTION

It is an object if the invention to provide an improved and reliable means for error proofing body shop component selection. Another object of the invention is to automatically determine if the correct sheet metal parts have been selected.

In accordance with the objects of this invention, a method for error proofing body shop component selection is provided. In one aspect of the invention, a method for error proofing body shop component begins by scheduling the production of a vehicle body using an assembly plant controller. A version of a sheet metal component is then selected. The version of the sheet metal component determines what body type will be produced. To insure that the proper body type is being produced, the assembly plant controller verifies the version of the sheet metal component by using a plurality of sensors. If the wrong sheet metal component is detected, then the body shop process is stopped and the wrong sheet metal part is replaced with the correct sheet metal part. Once all correct sheet metal parts are in place, they are spot welded together to produce a vehicle body.

The present invention achieves an improved and reliable means for error proofing body shop component selection. Also, the present invention is advantageous in that it reduces the number of scrap bodies caused by human error.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
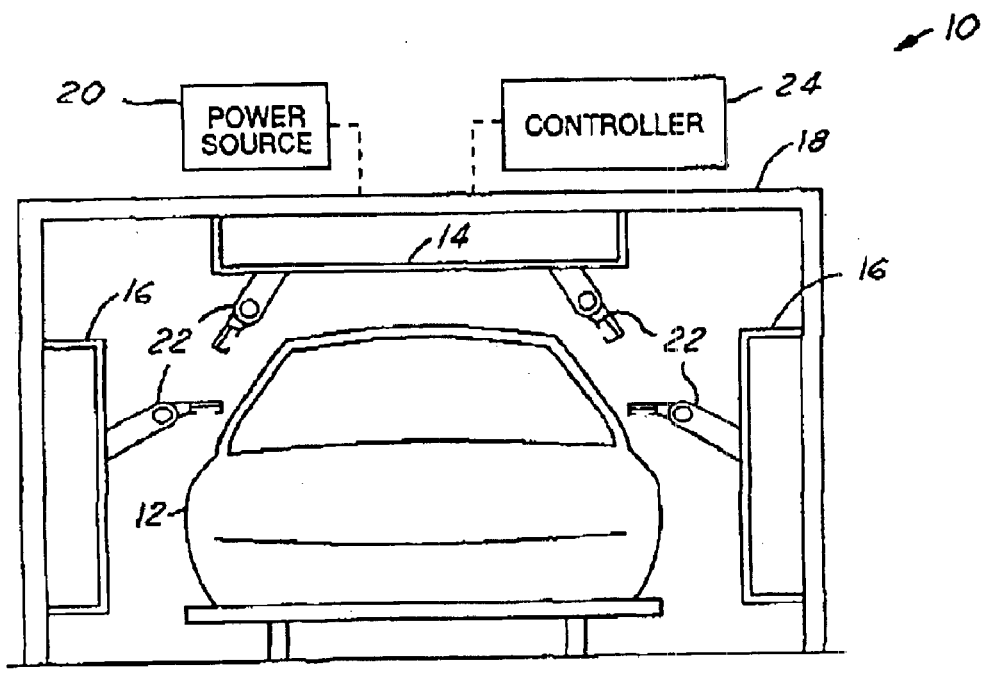
FIG. 1 is a depiction of a vehicle welding fixture according to one embodiment of the present invention.

In the following figures, the same reference numerals will be used to identify identical components in the various views. The present invention is illustrated with respect to a welding process particularly suited for the automotive field. However, the present invention is applicable to various other uses that may require correct component selection between different versions of products.

Referring to FIG. 1, a vehicle welding fixture 10 according to one embodiment of the present invention is illustrated. System 10 includes a plurality of robotic arms that may include an overhead arm 14 and side arms 16. Each arm 14, 16 is coupled to a rack 18. In such systems, arms 14, 16 move according to XYZ coordinates with respect to rack 18. Commonly, the XYZ coordinates of arms 14, 16 vary depending upon the part 12 to be welded. Each arm 14, 16 has a plurality of motors (not shown) that permit movement of the arms 14, 16 into desired positions with respect to part 12. A power source 20 is coupled to vehicle welding system 10 to power arms 14, 16. Each arm 14, 16 has a spot welding head 22 positioned thereon. As will be further described below, each spot welding head 22 generates a spot weld with respect to part 12.

Each time a new version of a vehicle body is required, sheet metal parts corresponding to the desired version of vehicle body are inserted into fixture 10. In one aspect of the present invention, an assembly plant body shop includes a plurality of automated welding fixtures 10 for producing several versions of a vehicle body 12. As each vehicle body 12 progresses down the body shop assembly line more sheet metal parts are added until a final body is produced. Before each station is executed, an operator loads the sheet metal part required for the station.

In many cases, the sheet metal part used is specific to a different version of the final vehicle. In each case where a different sheet metal part would change the version of the vehicle body being produced, a system is used to verify that the part being used matches the body version that is scheduled to be produced. To verify the presence of the correct part at each station, a multitude of sensors (proximity, magnetic, optical, etc.) is used to determine which part is present in the fixture. These sensors are coupled to a controller 24 that is in communication with the plant system that determines which version of a vehicle is required. If the sensors detect that an incorrect part is present, then the body shop assembly line is stopped until a corrective action is taken.

Figure 2:
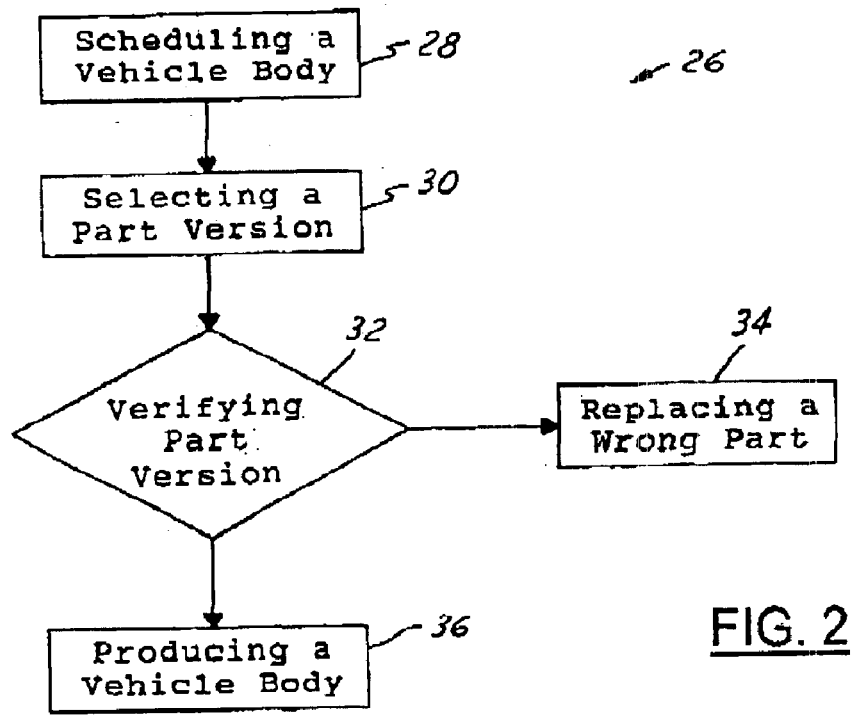
FIG. 2 is a block diagram of a method for error proofing body shop component selection according to one embodiment of the present invention.

Referring to FIG. 2, a block diagram of a method 26 for error proofing body shop component selection according to one embodiment of the present invention is illustrated. Method 26 begins with step 28 by scheduling the production of a consumer product, such as a vehicle body, using an assembly plant controller. The sequence then proceeds to step 30 where a part version of a part, such as a sheet metal component is selected for the consumer product. The version of the part determines what product version, such as body type, will be produced. In step 32, the assembly plant controller verifies the version of the sheet metal component by using a plurality of sensors. If the wrong sheet metal component is detected, then the body shop process is stopped and the wrong sheet metal part is replaced with the correct sheet metal part in step 34. Finally, in step 36, once all correct sheet metal parts are in place, they are spot welded together to produce a vehicle body.

The method and system of the present invention reduces the amount of scrap vehicle bodies produced by eliminating human error in component selection. Additionally, the invention automatically determines if the correct sheet metal parts have been selected.

From the foregoing, it can be seen that there has been brought to the art a new and improved method for error proofing body shop component selection. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for error proofing body shop component selection comprising the steps of:

scheduling the production of a consumer product using a controller, wherein said consumer product includes at least two product version of said consumer product and wherein the production of said at least two versions of said consumer product corresponds to customer demand such that an order of said at least two versions can be varied as needed;

selecting a part version of a part for said consumer product, wherein said part version determines said product version of said consumer product;

verifying said part version of said part using said controller, wherein said controller compares said part version against an expected part version corresponding to said product version;

implementing a corrective action when said part version does not correspond with said product version; and producing said consumer product when said part version does correspond to said version.

2. The method for error proofing body shop component selection as recited in claim 1, wherein said consumer products are vehicle bodies.

3. The method for error proofing body shop component selection as recited in claim 1, wherein said parts are sheet metal components.

4. The method for error proofing body shop component selection as recited in claim 1, wherein said step of verifying a part version of said part comprises using a plurality of sensors coupled to said controller to determine part version.

5. The method for error proofing body shop component selection as recited in claim 4, wherein said plurality of sensors comprises proximity sensors.

6. The method for error proofing body shop component selection as recited in claim 4, wherein said plurality of s4nsors comprises magnetic sensors.

7. The method for error proofing body shop component selection as recited in claim 4, wherein said plurality of sensors comprises optical sensors.

8. The method for error proofing body shop component selection as recited in claim 1, wherein said step of implementing a corrective action comprises stopping an assembly plant body shop.

9. The method for error proofing body shop component selection as recited in claim 1, wherein said step of producing said consumer product comprises spot welding sheet metal components together to produce a vehicle body.

10. A method for error proofing body shop component selection comprising the steps of:

scheduling the production of a vehicle body using an assembly plant controller, wherein said vehicle body includes at least two body types and wherein the production of said at least two versions of said consumer product corresponds to customer demand such that an order of said at least two versions can be varied as needed;

selecting a part version of a sheet metal component for said vehicle body, wherein said part version determines said body type of said vehicle body;

verifying said part version of said sheet metal component using a plurality of sensors coupled to said assembly plant controller, wherein said assembly plant controller compares said part version against an expected part version corresponding to said body type;

stopping an assembly plant body shop when said part version does not correspond with said product version;

replacing said sheet metal component with a correct sheet metal component; and spot welding sheet metal components together to produce a vehicle body when said part version does correspond to said product version.

* * * * *

UNITED STATES PATENT AND TRADEMARK OFFICE
CERTIFICATE OF CORRECTION

PATENT NO. : 6,944,516 B1  Page 1 of 1
DATED : September 13, 2005
INVENTOR(S) : Dave Roy Collins and Steve Wendland It is certified that error appears in the above-identified patent and that said Letters Patent is hereby corrected as shown below:

Column 4,
Line 18, delete "s4nsors" and insert -- sensors --.

Signed and Sealed this

Twenty-first Day of March, 2006

JON W. DUDAS
*Director of the United States Patent and Trademark Office*